United States Patent
Panabaker et al.

(10) Patent No.: US 7,603,385 B2
(45) Date of Patent: Oct. 13, 2009

(54) DEVICE CONSTELLATION MANAGEMENT

(75) Inventors: Ruston John David Panabaker, Bellevue, WA (US); Eric Horvitz, Kirkland, WA (US); Gregory Baribault, Lynnwood, WA (US); Michael Sinclair, Kirkland, WA (US); Alexander Frank, Bellevue, WA (US); Scott C. Forbes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 172 days.

(21) Appl. No.: 11/561,853

(22) Filed: Nov. 20, 2006

(65) Prior Publication Data
US 2008/0120401 A1 May 22, 2008

(51) Int. Cl.
*G06F 17/00* (2006.01)
(52) U.S. Cl. .................. 707/104.1; 707/1; 707/10; 709/243; 709/248
(58) Field of Classification Search .................. 707/1, 707/2, 10, 100, 104.1; 709/204, 205, 207, 709/220, 221, 238, 243, 248
See application file for complete search history.

(56) References Cited

U.S. PATENT DOCUMENTS

| | | | |
|---|---|---|---|
| 5,611,050 | A | 3/1997 | Theimer et al. |
| 6,564,261 | B1 | 5/2003 | Gudojonsson et al. |
| 6,691,151 | B1 | 2/2004 | Cheyer et al. |
| 6,697,840 | B1 | 2/2004 | Godefroid et al. |
| 6,950,853 | B2 | 9/2005 | Garcia-Luna-Aceves et al. |
| 2004/0181577 | A1 | 9/2004 | Skurikhin et al. |
| 2004/0221010 | A1 | 11/2004 | Butler |
| 2005/0286546 | A1* | 12/2005 | Bassoli et al. ............. 370/432 |
| 2006/0010240 | A1 | 1/2006 | Chuah |
| 2006/0026588 | A1 | 2/2006 | Illowsky et al. |
| 2006/0075024 | A1 | 4/2006 | Zircher et al. |
| 2006/0080432 | A1 | 4/2006 | Spataro et al. |
| 2006/0168351 | A1* | 7/2006 | Ng et al. .................. 709/248 |

OTHER PUBLICATIONS

Kundan Singh et al. "Comprehensive Multi-platform Collaboration", Proceedings of SPIE—Multimedia Computing and Networking 2004, Dec. 2003, pp. 199-210, vol. 5305.
Hans-Peter Dommel et al. "Design issues for floor control protocols", Proc. SPIE, Multimedia Computing and Networking, 1995, vol. 2417.
G. Manjunath et al. "Smart Edge Server—Beyond a Wireless Access Point", Proceedings of the 2nd ACM international workshop on Wireless mobile applications and services on WLAN hotspots, 2004.
Munir Mandviwalla et al. "TeamBox: An Exploration of Collaborative Interoperability", Conference on Supporting Group Work Proceedings of conference on Organizational computing systems, 1995, pp. 347-353.

(Continued)

*Primary Examiner*—Etienne P LeRoux
*Assistant Examiner*—Bruce A Witzenburg (57) ABSTRACT

A method and apparatus is provided for managing a plurality of devices in a federated network and a sub-network within the federated network. The devices in the sub-network may have a functional capability of performing a function associated with the federated network. For example, the federated network may include devices for providing data content such as media content and the sub-network may include devices for controlling the presentation of the data content. In addition, a constellation of devices is provided that may share data content such as media data. At least some of the devices in the constellation may form a sub-network.

20 Claims, 6 Drawing Sheets

OTHER PUBLICATIONS

Frankie James "Federatd Devices: Augmenting Mobility with Ambient Resources", CHI 2006, Apr. 22-27, 2006, Montreal, Canada.
"DLNA Overview and Vision Whitepaper 2006", Copyright 2006 Digital Living Network Alliance.

R.Y. Fu et al. "A framework for device capability on demand and virtual device user experience", IBM J. Res. & Dev., 2004, vol. 48, No. 5/6.

* cited by examiner

DEVICE CONSTELLATION MANAGEMENT

BACKGROUND

User devices may function with other devices in a network in a federation or constellation of devices. Often, user devices may be capable of performing certain functions but may also be incapable of performing other functions. However, certain devices may not have access to certain federated networks. For example, if data is being exchanged in a federated network among a group of federated devices, another device may not have authorization to access the data being exchanged in the network. In this case, the device may be unable to participate in the network even if the device has the capabilities of receiving and processing the data.

Also, in a federated network, the devices participating in the network may access the data being exchanged in the network but may exclude other devices that may not have authorization for the data. In the case where the network has a multiplicity of functions and processes, it may be desired that certain functions or processes be accessible to certain devices in the federation but not others. However, if a device has authorization to participate in the federation, the device will be able to access any of the data being exchanged and may further be able to control the presentation of the data. This may result in an unwanted outcome in which a user may have access to information which the user should not have.

Therefore, in a typical network, certain user devices may be excluded from the network even though access to the network is desired for those devices while other devices may have access to the network while access to at least some aspects or functions of the network for those other devices is unwanted.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A method is provided for managing a plurality of devices in a federated network and a sub-network within the federated network. In one example, the devices in the sub-network have the capability of performing a function associated with the federated network. The federated network may include, for example, devices for providing data content such as media content.

In another example, a subset of devices in the federated network form a sub-network or closed system such that devices in the federated network that are not included in the sub-network or closed system do not participate in the sub-network or closed system.

In another example, the devices in the sub-network of the federated network have a functional capability for performing a function. For example, devices in the network may share data content and devices in the sub-network may share data content and control of data content.

Also, a constellation network such as a network of devices for performing a task is provided including a plurality of devices in a federated network. The devices in the constellation network may share data content such as media data. Additionally, at least some of the devices may control the presentation of data content.

In another example, new devices may join the constellation network based on capabilities of the devices.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

A method and system for facilitating federation of user devices in a network is described. Such a network may include federated devices in a federated network for performing a task or function. Each of the devices in the federated network may have a functionality or capability for performing the task or function. The network may encompass substantially all of the devices in the federated network. Such a network may be termed a constellation network or, alternatively, a federated constellation network. The specification alternatively refers to such a network as a federated network, a constellation network or a federated constellation network. The federated constellation network may also include sub-networks of devices in which a subset of devices in the federated constellation network (or constellation network) are capable of performing a specified function or functions. Devices in the federated constellation network that are not within the sub-network may have no access to data, activities, or functions of the sub-network. Conversely, if desired, devices in the sub-network may have no access to or limited access to certain functions, activities or data of the federated constellation network.

Figure 1:
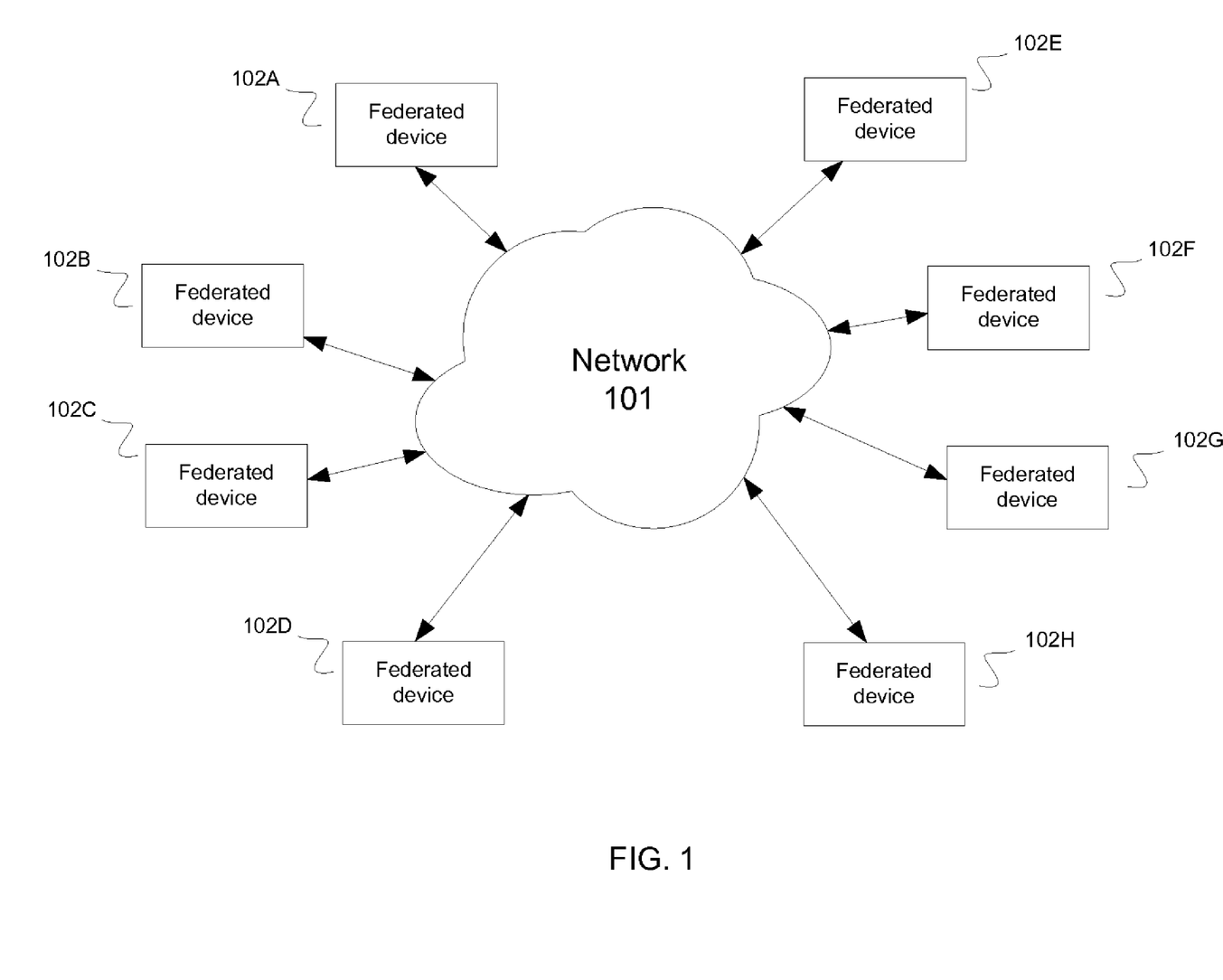
FIG. 1 is a partial block diagram illustrating a network of federated devices.

FIG. 1 is a partial block diagram illustrating an example of a network of federated devices or a federated constellation network. In this example, federated devices (102A, 102B, 102C, 102D, 102E, 102F, 102G, 102H) may be connected in a network 101 and exchange data via the network 101. The federated devices may be of any type of device capable of exchanging data. For example, a federated device may be an MP3 player, a stereo system, a media center, a telephone, a mobile device, a handheld digital device, etc. At least some of the federated devices may be capable of controlling the presentation or delivery of data. One example of such a device includes an MP3 player that is capable of controlling the delivery of audio data by controlling the volume, balance, etc. Also, in a federated network 101 such as the network illustrated in FIG. 1, any of the federated devices capable of controlling the delivery of data may control any of the other federated devices that are capable of providing the data.

Figure 6:
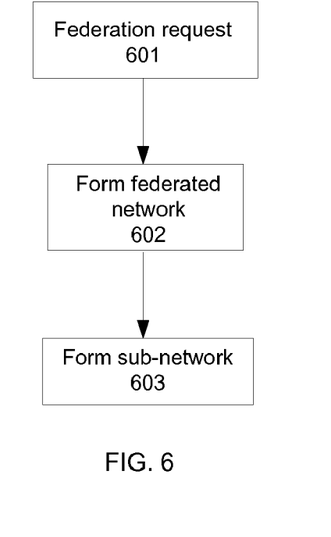
FIG. 6 is a flowchart illustrating one example of user devices forming a federated network.

FIG. 6 is a flowchart illustrating one example of user devices forming a federated constellation network. In STEP 601, a request for federation of devices is received. The request may be received from any type of device capable of functioning in a federated constellation network. Examples of such a device include an MP3 player, a radio, a television, a stereo system, a computer, a telephone, etc. The device may transmit a request message to another device or to a server. Based on the request message, the device may form an ad hoc federated constellation network with at least one other device to form the federated constellation network (STEP 602). As additional devices are added to the federated constellation network, any of the devices may form sub-networks with any of the other devices within the federated constellation network (STEP 603). In this case, at least a portion of the devices that participate in the federated constellation network may form a proprietary network such that federated devices in the federated constellation network that do not have access to the proprietary network do not participate in the functions of the proprietary network. Hence, responsive to the request for federation, a federation of devices may form a federated constellation network such that data and functions pertaining to the data may be shared among the devices. In addition, certain functions or data may be shared by a subset of devices in the federation while other devices in the federation may lack access to these functions or data.

Figure 2:
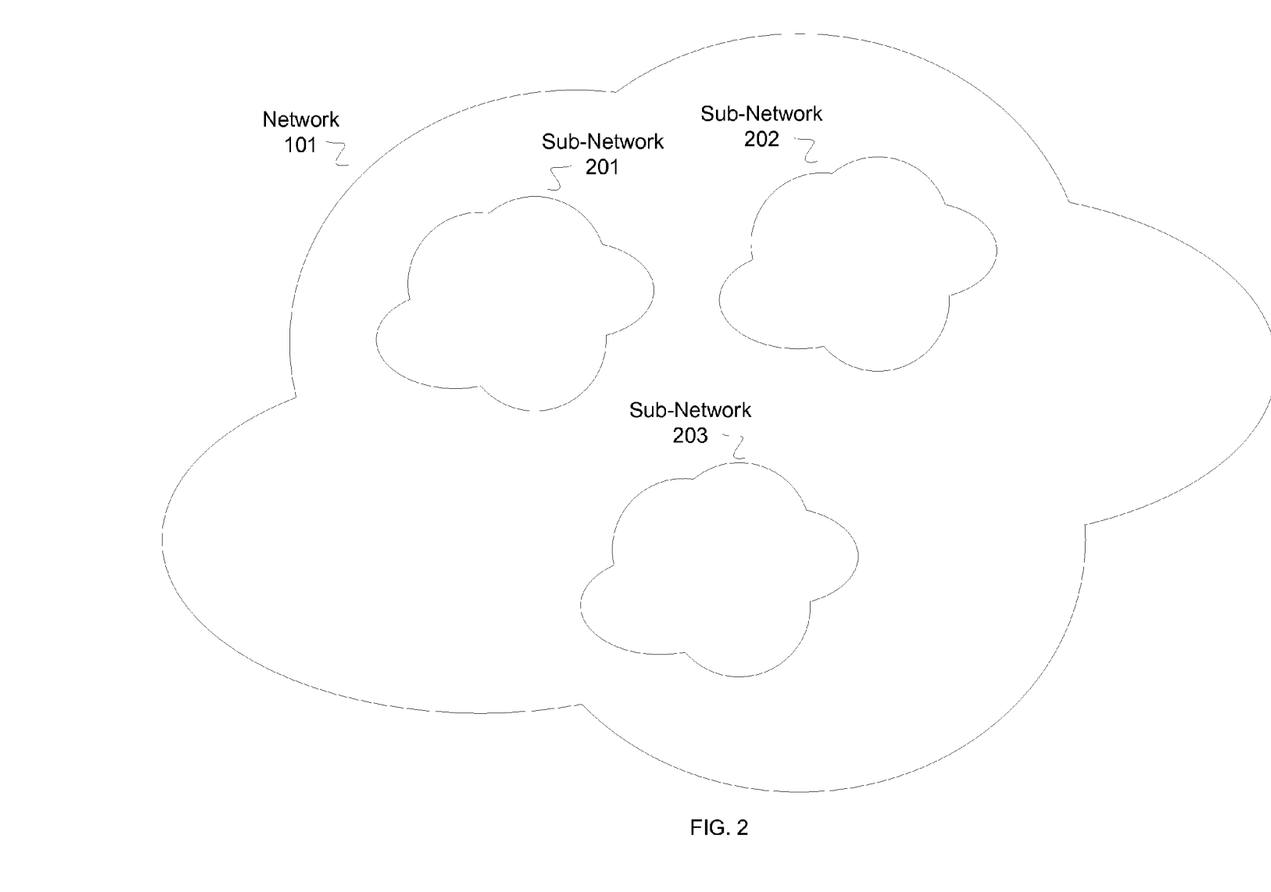
FIG. 2 illustrates an example of a network containing a sub-network or closed system.

A network 101 (e.g., FIG. 1) may include any number of federated devices. Also, the federated devices in the network 101 may have access to the entire network 101 (e.g., federated constellation network) or may have access only to portions of the network 101. Similarly, some of the federated devices in the network 101 may form a sub-network within the network 101. The sub-network (or closed system) thus formed may be closed to other devices that do not participate in the closed system. An example of sub-networks is illustrated in FIG. 2 described below. For example, other federated devices in the network 101 (e.g., federated constellation network) that do not have access to the closed system or the sub-network formed by the federated devices that do access and participate in the closed system are excluded from the closed system within the network 101. However, these federated devices may still participate and access other aspects of the network that is outside of the closed system within the network 101.

FIG. 2 illustrates an example of a federated constellation network containing a sub-network or closed system. In this example, the network 101 (e.g., federated constellation network) contains three sub-networks (201, 202, and 203). Each of the sub-networks, or closed systems, 201, 202, and 203 are contained within the network 101. Federated devices in the network 101 may participate in the activities and functions of the network 101. For example, if the network 101 includes the communication of media data among participating federated devices, then the federated devices in the network 101 may exchange media content.

In this example, network 101 is an "all in" network 101 (e.g., a federated constellation network) such that both open and closed systems may federate. For example, network 101 is an open system or federated constellation network such that all participating federated devices in the network 101 may participate in activities in the network 101. Also, closed systems such as sub-networks 201, 202, and 203 may federate with the open system (network 101) to form the sub-networks of network 101. As FIG. 2 illustrates, sub-networks 201, 202, and 203 each form separate closed systems for at least a subset of federated devices participating in activities of network 101. For example, certain activities in network 101 may be accessible to only a subset of federated devices that participate in the activities of the network 101. Thus, a federated device within network 101 may federate for functions associated with network 101 while not federating for functions associated with a closed system or sub-network (e.g., 201, 202, 203).

A closed system or sub-network (e.g., 201, 202, 203) may form a proprietary network or a private network within the larger federated constellation network (e.g., network 101). In this example, federated devices that participate in proprietary functions of a sub-network may participate in the activities and functions associated with the corresponding sub-network. However, those federated devices in the network 101 (e.g., federated constellation network) that do not access or participate in the functions associated with the sub-network may be excluded from those activities. In one example, these federated devices within the federated constellation network have no access to the data of the devices that participate in the activities and functions associated with the sub-network.

For example, if a first federated device in network 101 such as a federated constellation network, has access and participates in functions of sub-network 201, then the first federated device may participate in the functions of sub-network 201 and the functions of the larger constellation network 101. If a second federated device in network 101 has access and participates in functions of sub-network 202, then the second federated device may participate in the functions of sub-network 202 and the functions of the larger constellation network 101 (e.g., federated constellation network). However, if the second federated device does not have access to the functions of sub-network 201 (e.g., because sub-network 201 may be a proprietary network), then the second federated device does not participate in the functions of sub-network 201 and has no access to data of sub-network 201. Similarly, the first federated device does not participate in the functions of sub-network 202 if the first federated device does not have access to the (proprietary) sub-network 202.

Figure 3:
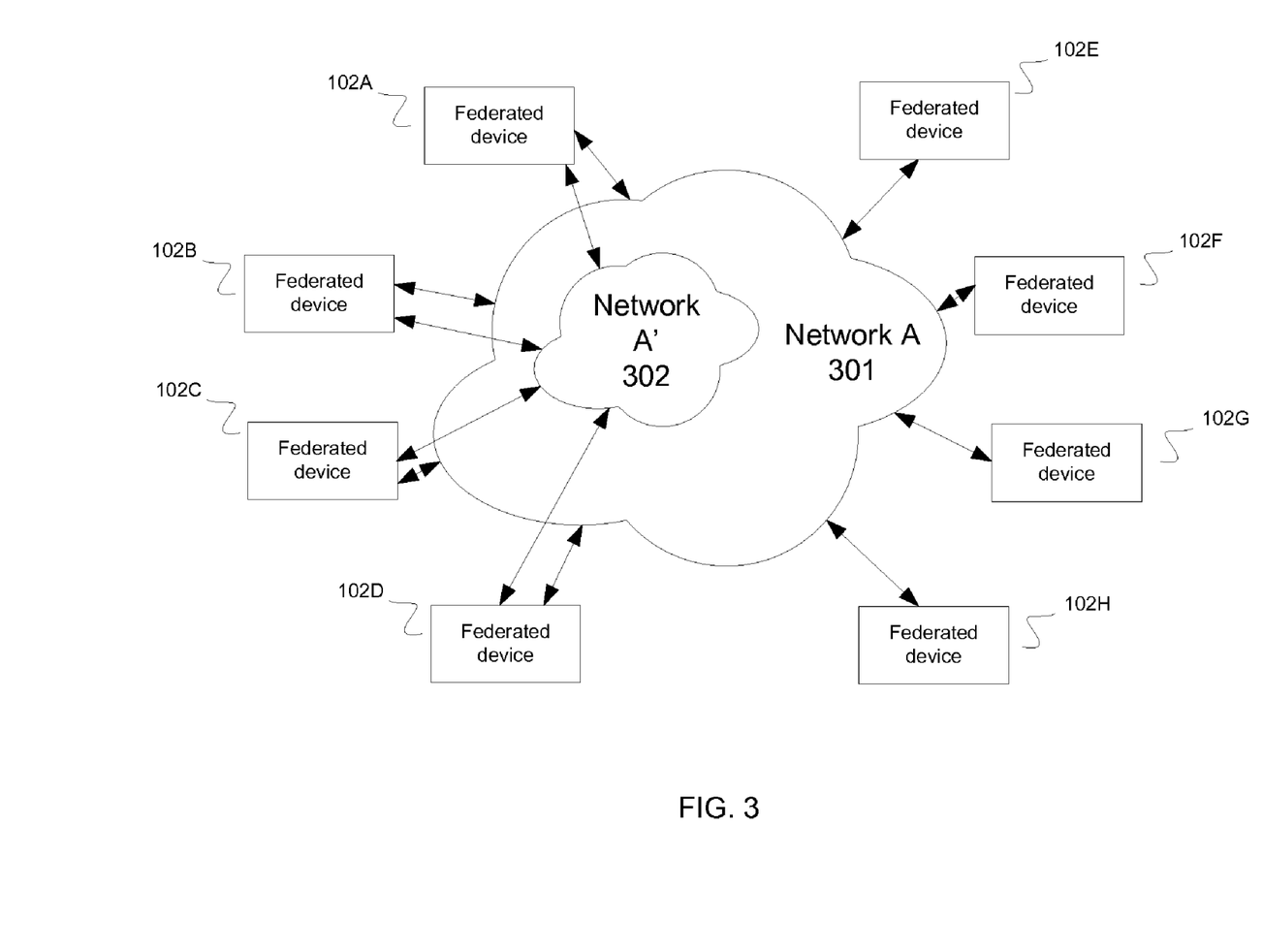
FIG. 3 illustrates a network containing a sub-network or closed system in which federated devices may access data in the network or sub-network.

FIG. 3 illustrates a federated constellation network containing a sub-network or closed system in which federated devices may access data in the network or sub-network. In this example, Network A 301 is a large constellation network (e.g., federated constellation network) in which federated devices 102A, 102B, 102C, 102D, 102E, 102F, 102G, and 102H, participate. For example, the federated devices may be devices capable of receiving, exchanging, sharing, and/or presenting media data to respective users.

As FIG. 3 illustrates, each of the federated devices participates in the functions of Network A 301, the federated constellation network. If the federated constellation network 301 has functions of exchanging media data, then each of the federated devices may form the federated constellation network and exchange the media data. However, the federated constellation network 301 as illustrated in FIG. 3 also has a closed system (network A' 302) in which some of the federated devices may federate while at least a portion of the federated devices may not. For example, some of the federated devices may not have access to the functions of Network A' 302. Also, devices in a sub-network may have no access to data of a device not in the sub-network. For example, device 102A, 102B, 102C 102D form Network A' 302 and may have access to data of each of the devices in Network A' 302. However, devices 102E, 102F, 102G, and 102H, although within Network A 301, are not associated with the sub-network (Network A' 302). Therefore, in this example, devices 102E, 102F, 102G, and 102H do not have access to data of devices 102A, 102B, 102C, and 102D.

In this example, federated devices 102A, 102B, 102C, and 102D have access to the functions of network A' 302 (as depicted by the double arrows between each of the federated devices and network A' 302). Thus, federated devices 102A, 102B, 102C, and 102D form a proprietary network within the federated constellation network, Network A 301. At the same time, federated devices 102E, 102F, 102G, and 102H have access to the functions of the federated constellation network A 301 but do not have access to the functions of the sub-network or proprietary network, Network A' 302. In addition, federated devices may interact with other federated constellation networks without traversing the network. For example, federated device 102D may interact directly with federated device 102E. One example of such an interaction may be a peer-to-peer sub-network.

In an example to illustrate, Network A 301 may include a container or schema for devices participating in a constellation for providing media data. For example, a federated device such as federated device 102A may be an MP3 player for providing media data to a user. Also, the MP3 player may be capable of controlling output of the media data. If another federated device, such as federated device 102E, is a computer, for example, the MP3 player may be moved in proximity of the computer such that media data playing on the MP3 player may be played on the computer. Also, the user of the MP3 player may control the playing of the media data on the computer or the MP3 player by operating controls on the MP3 player. In this example, functions of the federated constellation network, Network A 301 may include playing the media data such that both of the federated devices 102A and 102E (the MP3 player and the computer, respectively, in this example) may play the media data. A function of the sub-network or proprietary network (Network A' 302) may include controlling the playing of the media data. In this example, both the MP3 player and the computer are capable of playing the media data while the MP3 player may control playing of the media data. The computer in this example is incapable of controlling the playing of the media data.

Figure 4:
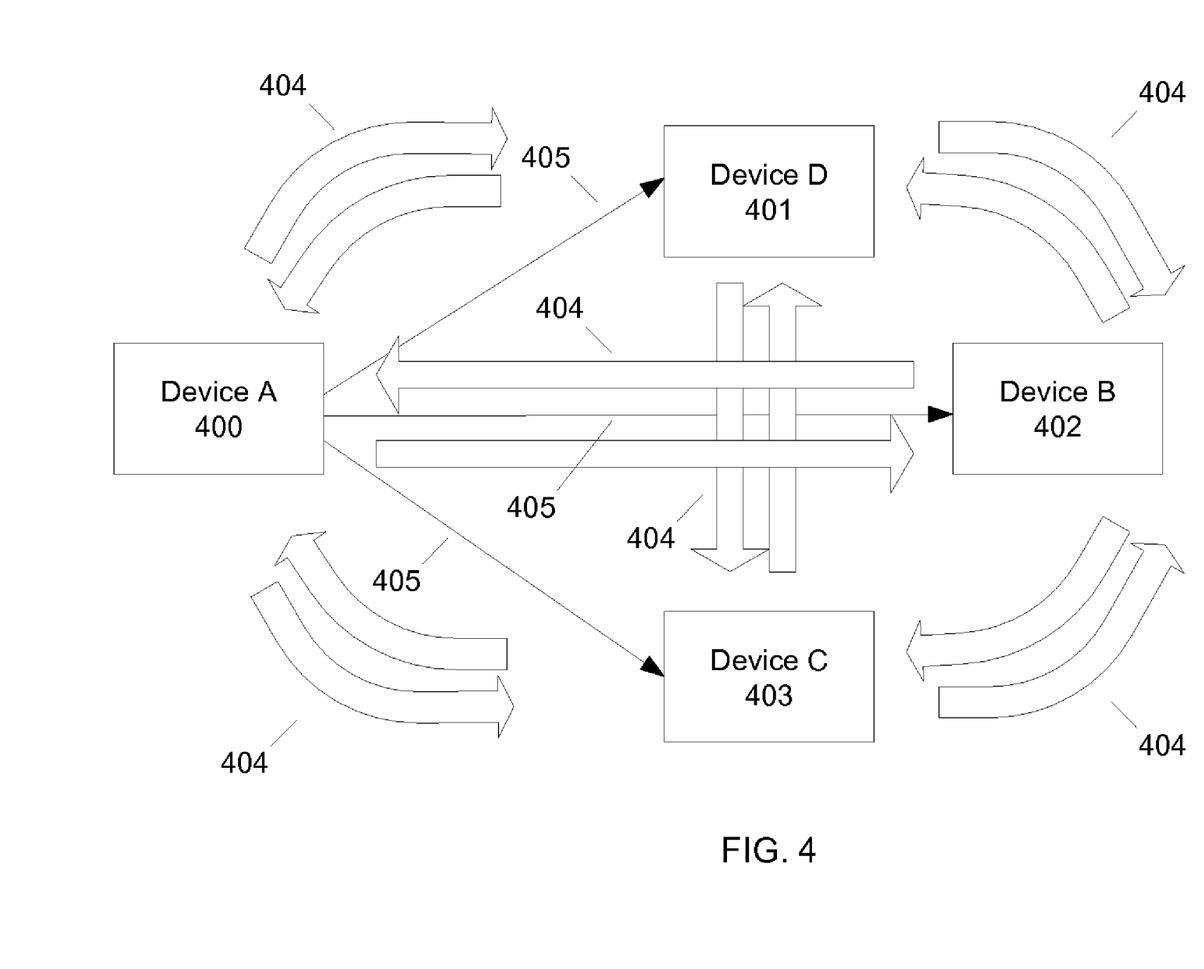
FIG. 4 illustrates an example of devices in a federated network.

FIG. 4 illustrates an example of devices in a federated constellation network. In this illustration, block arrows 404 indicate data exchange between devices and line arrows 405 indicate control between devices. Device A 400 may be a media device such as an MP3 player which may control other devices in the network such as Device B 402, Device C 403, and Device D 401. Each of the devices may participate in the federated constellation network. In addition, there is also the capability of forming a propriety network with separation from the federated constellation network. In this example, Device A 400 (e.g., MP3 player) may participate in a proprietary network and gain access to metadata playing on the federated constellation network. In one example, music may be playing on Device B 402, which may be a computer, for example. The user of the MP3 player may approach the computer and control the delivery of the music on the computer. If the music is playing loudly, for example, the user may reduce the volume of the music playing on the computer by executing controls on the MP3 player. Alternatively, the user of the MP3 player may pause or stop the music or play the music on another device in the federated constellation network (e.g., speakers which may be either Device C 403 or Device D 401 in the example illustrated in FIG. 4).

Similarly, if music is playing on any of the other devices (e.g., Device C 403 or Device D 401) in the federated constellation network, the MP3 player may also control the delivery of music on the other devices. In addition, metadata associated with the media data may be displayed on the MP3 player display or any other display on any device in the federated constellation network. The presentation of the metadata may likewise be controlled by the MP3 player, in this example.

The block arrows in FIG. 4 illustrate the sharing of content among the devices in the federated constellation network. As FIG. 4 illustrates, each of the devices in the federated constellation network participates in the sharing of content. Content may be shared and/or transferred among any of the devices 400, 401, 402, or 403. Additional arrows in FIG. 4 illustrate control features in the network. These control features are functions associated with a sub-network of Device A 400 (i.e., the MP3 player in this example). Hence, the MP3 player may control the presentation of media data on any of the devices.

In another example, a device may enter a federated constellation network or sub-network based on the capabilities of the device. The device may be a federated device in a network that sends a message to enter a sub-network within the federated constellation network. Prior to entering the sub-network, the federated device may lack access to data in the sub-network. After sending the message to enter the sub-network, the device may be selected for inclusion in the sub-network responsive to the message.

In one such example, the message received from the device requesting entry into the sub-network may contain an indication of a capability of the device. For example, the indication included in the message may indicate that the device contains a controller capable of controlling media data. Also, the message may indicate that the device has a transcoder for transcoding media data or a component for playing or otherwise controlling media data. The capabilities of the device is compared to functions associated with the federated constellation network and/or sub-network. If a match is identified between function(s) supported or provided by a network and a capability of the device, then the device may be selected for inclusion in the network. In one example, the network may have a functionality of playing MP3 data and a new device requesting entry into the network contains an MP3 playing component. In this case, the system may identify a match between the capability of the device (i.e., playing MP3 data) and a function of the network (managing and playing MP3 music). Thus, the device may be selected for the federated constellation network or sub-network and the selection is based on capability of the device to perform the function of the sub-network.

Figure 7:
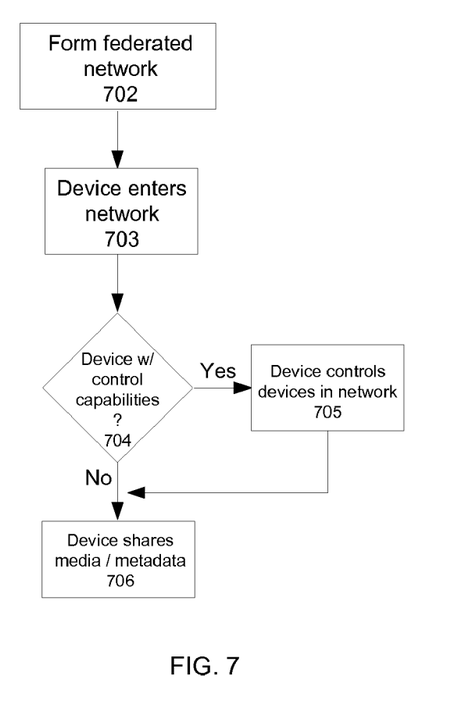
FIG. 7 is a flowchart illustrating an example of providing data content and control of data presentation in a federation of devices.

FIG. 7 is a flowchart illustrating an example of providing data content and control of data presentation in a federation of devices. In STEP 702, a federated constellation network is formed including a network of federated devices as described. The federated devices may include, for example devices for providing or controlling media data. In addition, devices may be added to a federated constellation network. In this case, a network of media devices may provide media content and control of the media content. A new device may desire entry into the network, for example, a new MP3 player may wish to access the data content and corresponding metadata of the data content in the network. Optionally, an authentication procedure may be employed (e.g., password or other identification of the incoming device) prior to permitting entry of the new device into the network (STEP 703).

The entering device may have control capabilities ("YES" branch of STEP 704). For example, the media data may be controlled or manipulated based on functions provided by the new entering device. These functions may include, for example, control capabilities or transcoding capabilities, etc. For example, the new device may be used to pause the media data, stop the media data, control the volume, etc. In addition, the entering device may share media content with the other devices in the federated constellation network (STEP 706). In this example, displaying media content is a function of the federated constellation network and is a function of each of the federated devices in the network. Hence, the entering device may share media content with the other devices in the federated constellation network (STEP 706). If the entering device has control capabilities, then the entering device may also enter a sub-network (e.g., proprietary network) of controlling the display of media content. In this example, entry into the sub-network of the federated constellation network may be based on capabilities of the devices (e.g., devices with control capabilities may enter the sub-network). However, any desired criteria may be used.

In another example, a device such as the MP3 player may be included in a container or schema for devices in the federated constellation network. The MP3 player may further include a plug-in to manage the content and the control features of the federated constellation network devices. The plug-in may further be proprietary for accessing metadata playing on the network. In such a system, the MP3 player may be used to control the music or media data playing on other devices in the federated constellation network, may access the associated metadata, or may provide the associated metadata to any of the devices in the federated constellation network.

Figure 5:
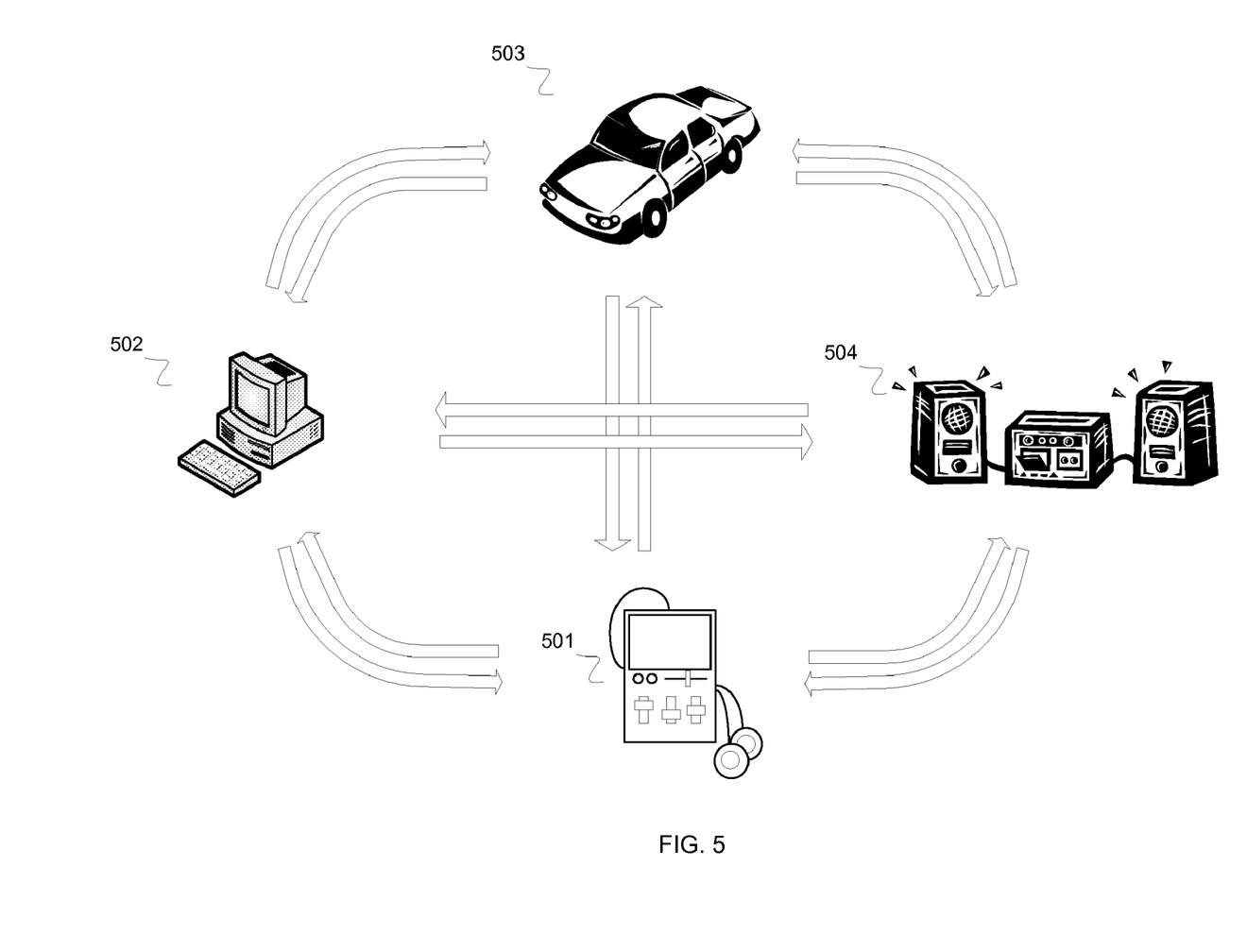
FIG. 5 illustrates an example of a federated network including a plurality of devices.

In addition, federation of content of the media data and/or control of the presentation of the media data among devices in a network may be performed in a substantially continuous manner. As the example in FIG. 5 illustrates, if a federated constellation network includes an MP3 player 501, a computer 502, a car radio 503, and a home stereo 504, any device in the network that is capable of controlling the presentation of the media data may be used to control the playback of media. The MP3 player 501 may include an input device for controlling the presentation of the media data on the MP3 player 501 as well as on any of the other devices such as the computer 502, car radio 503, or the home stereo 504. In addition, the media data may be controlled by any other device in the network that is capable of controlling the media data. For example, the home stereo 504 or car radio 503 may be capable of controlling playback of the media data while the computer 502 may lack the capability. If this is the case, then playback of the media data on any of the devices may be controlled by the MP3 player 501, car radio 503, or the home stereo 504 but not the computer 502.

At the same time, the media data may be provided on any device capable of providing the media data. Also, a user may obtain metadata about the media data being presented on any device in the federated constellation network and presentation of the media data may change between the devices in the federated constellation network as desired. For example, a user of the MP3 player may be receiving music on the MP3 player and may get in a car such that the user is also in proximity of the car radio 503. The MP3 player 501 and the car radio 503 may exchange capability information to determine if the car radio should take over in playing the music. The capability information may include any information pertaining to the capabilities of the individual devices in the federated constellation network including, but not limited to, media capabilities, user-control capabilities, speakers, transcoding capabilities, etc. In this example, the car radio may take over playing the music and the metadata corresponding to the music may be communicated from the MP3 player 501 to the car radio 503. Also, based on the relative capabilities of the car radio 503 and the MP3 player 501, the MP3 player may retain control of the playback of the music.

Thus, in this example, devices in a federated constellation network may be forming sub-networks corresponding to different functions. Different devices may be included in some sub-networks but not others and may therefore be capable of performing certain functions but not others. Each individual function may result in a federation or re-federation of devices in the federated constellation network for the individual function to determine which devices may perform that function. For example, in a federated constellation network for providing media data, individual functions such as digital rights management, content, control of playback, etc. may be federating (and re-federating) as desired. Also, a new device may join a federated constellation network when a distance between the new device and an existing device in the federated constellation network is less than a predetermined distance. For example, a first device may be a portable device such as an MP3 player and may be moved while playing digital content. While being moved, the MP3 player may be moved into close proximity of other devices while being moved away from other devices. For example, the MP3 player may be moved within a predetermined distance of a home stereo while being moved away from a car and a car stereo. When the MP3 player is moved to within a predetermined distance of the home stereo, the home stereo may begin to play the digital content previously played by the MP3 player while the MP3 player may either continue playing the digital content or discontinue playing the digital content. As one example, a user may wish to receive the digital content on the MP3 player while roaming but may wish to receive the digital content on a stationary device (the home stereo) while not roaming. Thus, while receiving the digital content on the MP3 player, the user may return to the home stereo. The proximity to the home stereo may result in the home stereo taking over the playback of digital content. The predetermined distance to the home stereo may be any desired distance such as, but not limited to 2, 5, 10, 15, 20, or 25 feet and up.

Also, control of the playback of media may be performed on the stationary device (e.g., home stereo) after the first device (e.g., MP3 player). When the MP3 player is greater than a predetermined distance of the home stereo, control of playback of digital content of the MP3 player is performed by the MP3 player. However, when the MP3 player is moved to within a predetermined distance of the home stereo, the home stereo performs the desired music. Alternatively, playback of the digital content may be transferred to the home stereo while control of the playback of the digital content may be retained by the MP3 player (or shared between the MP3 player and the home stereo).

In addition, the devices may be federated for each function or group of functions separately. For example, the devices in a federated constellation network may federate for content such that certain devices may be used to play media content while others may not. Also, the devices in the federated constellation network may federate for control of the playback of the media data separately from the federation for content.

Based on the second federation (which may also be based on capabilities of the devices, for example), certain control-capable devices in the network may control the playback of the media data while other devices may not. In this way, different functions and capabilities may be federated among federated devices in the federated constellation network separately such that any of the functions may be performed on any of the devices individually.

Non-media devices may also be included in a network. For example, a sensor may be included as a federated device in the network such that environmental conditions may be detected and shared with the devices of the federated constellation network. In one example, a federated constellation network of media devices may share media data. The network may include a media player device in an automobile such that a driver of the car may, for example, listen to music while in the car. The network may further include a sensor for detecting traffic conditions such that when traffic or road conditions are dangerous or require heightened attention from the driver, the media playing on the media player device in the automobile may be muted. Hence, in this example, traffic conditions are sensed by a sensor in the network and the resulting information is relayed via the network to other devices within the network.

In another example, the federated devices may include a sensor for detecting an emergency broadcast. When an emergency broadcast is detected at the sensor, the sensor may transmit the information to the other devices in the network and/or interrupt playing of the media data. Interruption of playing of the media data may be automatic in response to the emergency broadcast signal or may be coordinated and controlled by a user at a device. For example, a user of one of the federated devices may control the other devices to interrupt the media data to display the information of the emergency broadcast and/or mute the regular media data being provided at the federated devices.

In addition, in some situations, a user may be charged or billed for federation of certain devices into a network. The billing may further be based on length of usage or number or type of devices used in the network. For example, a user or group of users may wish to present a speech or lecture with multimedia audiovisual aids. A conference room, auditorium, or other type of location for presenting the lecture may contain devices for presentation of information. For example, a conference room may contain a display, a keyboard, a computer, stereo equipment, speakers, projectors, pointers, microphones, mobile devices, cameras, etc. The room may be enabled to enable presentation of material by any number of users and may further control and/or direct the context, scheduling, or any administrative aspect of the presentation(s).

Thus, a camera may be directed to an entrance of the room such that the entrance of a main speaker or master of ceremony may be detected by the system. The devices may then aggregate into an ad hoc network for providing an audiovisual presentation from the speakers. A central component may receive a notification from the camera in this example indicating that the speech is to begin. The central component may coordinate other equipment in the room based on the notification. For example, the central component may direct a projector to project a desired image onto a display, activate a microphone and speakers, analyze the context of the lecture to determine, for example, who is presenting or who is next on the agenda. Also, a motion detector may be included in the network for identifying motion and gestures of individuals such as a speaker, spectator, etc. Also, a speech recognizer may be included for identifying a speaker and interpreting speech of different individuals. Thus, any device may be included in the ad hoc network.

In this example, usage of each of the devices may be recorded and stored. Usage information may include any relevant information for each device in the network such as the length of time used, the frequency of use during a designated time, the nature of the use, etc. Based on the use analysis, the system may generate a cost for the use of each of the devices. Hence, a user may be billed for the federation of the devices, by the nature of the federation, byte ha mount of time the devices are in use, etc.

Additionally or alternatively, an ad hoc federated network may form among devices based on a determination of desirability of the formation of the network. Detection of a desirability of forming the ad hoc network may be accomplished in a variety of ways and may be based on any number of factors. For example, the location of each of the devices or relative distances between the distances may be determined. In addition, the current usage of each of the devices, movement of the devices, direction, velocity of movement of the devices, or previous movement or activity of the devices, among other features of the devices may be used to determine desirability of formation of the network. In one example, a first set of devices may be in motion toward a second set of devices. The first set of devices may form an ad hoc federated network for accomplishing a certain task. The system may also determine that the first set of devices are approaching the second set of devices such that the second set of device may be added to the ad hoc federated network. In another example, the second set of device may also be in motion in a particular direction such that the system may determine that the task may be transferred to the second set of devices. Thus, in this example, the functions of the devices of the first set of devices may be passed off to the devices of the second set of devices analogous to "passing a baton" among devices.

In another example, prior activities of devices, scheduling information associated with devices or any similar type of information may be used to determine the likely future location of a device. Based on the location information of a device, the device may be added to the ad hoc federated network. Additionally or alternatively, devices may be reserved for use or inclusion in a federated network based on the determination of desirability of inclusion of the device in the federated network. This determination of desirability may be based, for example, on information pertaining to a likely future location and/or proximity information in relation to other devices at a particular time or time period of the device as described.

It is understood that aspects of the present invention can take many forms and embodiments. The embodiments shown herein are intended to illustrate rather than to limit the invention, it being appreciated that variations may be made without departing from the spirit of the scope of the invention. Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

The invention claimed is:

1. A method of managing a plurality of devices in a federated network comprising:
forming a federated network comprising a plurality of devices; and federating a sub-network of devices within the federated network comprising at least a portion of the plurality of devices, wherein the devices in the sub-network of devices have a capability of performing a function associated with the federated network and the function associated with the federated network comprises control of play of media data, and wherein the media data is initially played on a first device in the plurality of devices; and in response to the first device moving to within a predetermined distance of a second device in the plurality of devices, automatically beginning play of the media data on the second device and discontinuing play of the media data on the first device;

wherein play of the media data provides the media data to a user.

2. The method of claim 1 wherein the sub-network comprises at least one device of the plurality of devices, the at least one device including a functional capability corresponding to a function of the sub-network.

3. The method of claim 1 wherein the devices in the federated network not included in the sub-network of devices lack the capability of performing the function associated with the federated network.

4. The method of claim 1 wherein the step of forming the sub-network of devices includes:

receiving a message from a device in the plurality of devices, the message including an indication of capabilities of the device; and selecting the device for the sub-network based on the message.

5. The method of claim 4 wherein the step of selecting the device includes:

comparing the indicated capability of the device in the message with the function associated with the federated network;

determining a match between the indicating capability of the device and the function associated with the federated network; and selecting the device for the sub-network.

6. The method of claim 1 wherein the devices in the federated network share content.

7. The method of claim 1 wherein only the devices in the sub-network perform the function.

8. The method of claim 1 wherein media data is provided by the first device.

9. The method of claim 8 wherein play of the media data continues on the second device while the first device is within the predetermined distance of the second device.

10. The method of claim 8 wherein the sub-network of devices includes the first device.

11. The method of claim 8 wherein the devices in the plurality of devices receive metadata corresponding to the media data.

12. The method of claim 1 wherein the first device controls the playing of the media data after the first device moves to within the predetermined distance of the second device.

13. The method of claim 12 wherein the second device is outside of the sub-network of devices.

14. The method of claim 1 wherein the step of federating a sub-network of devices includes forming at least a first plurality of sub-networks of devices and a second plurality of sub-network of devices, each of the devices in each of the first and second pluralities of sub-networks of devices comprising devices selected from the plurality of devices of the federated network.

15. The method of claim 14 wherein a first sub-network of devices contains a first function and a second sub-network of devices contains a second function, and wherein each of the first and second sub-networks of devices federates independently.

16. The method of claim 1, wherein the first device controls an audible play volume of the media data on the second device.

17. The method of claim 1, wherein the first device controls a play balance of the media data on the second device.

18. A constellation of devices configured to enable devices to automatically join the constellation, wherein the devices participate in the constellation according to their capabilities as communicated within the constellation, and the constellation comprises first and second devices wherein the first device is configured to a) play and control media data, b) federate with the second device, c) and in response to the federation and the first device moving to within a predetermined distance of the second device, transfer play of the media data to the second device and discontinue play of the media data on the first device and control play of the media data on the second device; and wherein play of the media data provides the media data to a user.

19. The system of claim 18, wherein the first device is configured to control an audible play volume of the media data on the second device.

20. The system of claim 18, wherein the first device is configured to control a play balance controls a play balance of the media data on the second device.

* * * * *

UNITED STATES PATENT AND TRADEMARK OFFICE
CERTIFICATE OF CORRECTION

| | | |
|---|---|---|
| PATENT NO. | : 7,603,385 B2 | Page 1 of 1 |
| APPLICATION NO. | : 11/561853 | |
| DATED | : October 13, 2009 | |
| INVENTOR(S) | : Ruston John David Panabaker et al. | |

It is certified that error appears in the above-identified patent and that said Letters Patent is hereby corrected as shown below:

In the Claims:
In column 10, line 66, in Claim 1, after "devices;" delete "and".

Signed and Sealed this
First Day of February, 2011

David J. Kappos
*Director of the United States Patent and Trademark Office*